Dec. 11, 1923.
O. P. HOBBS ET AL
COTTON DUSTER
Filed Dec. 26, 1922
1,476,889
3 Sheets-Sheet 3
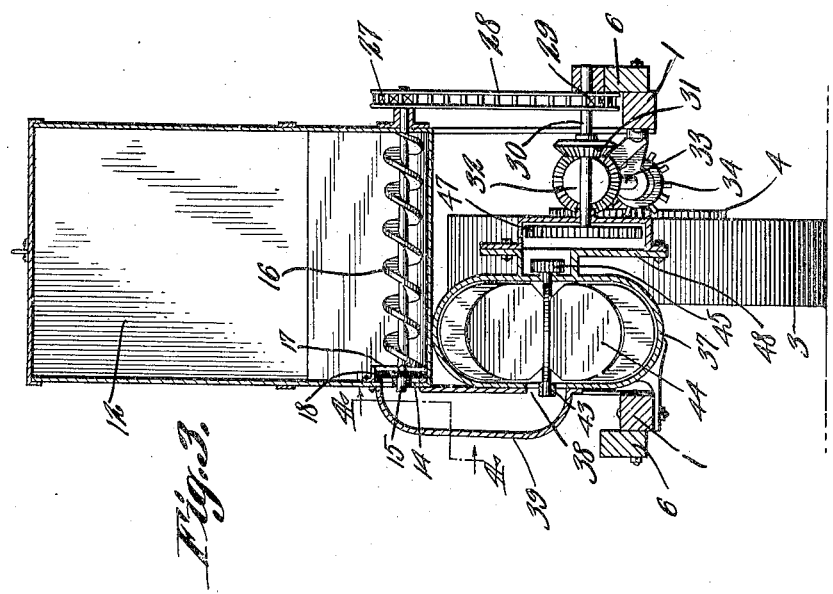
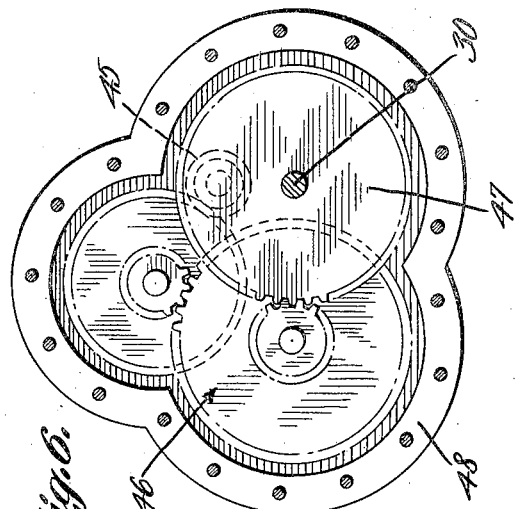
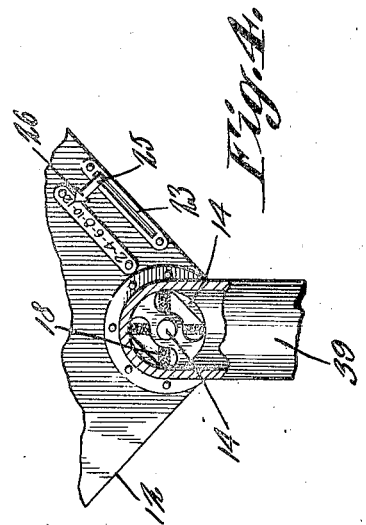
Inventors,
O.P. Hobbs,
H.T. Flanigan,
and P.A. Flanigan.

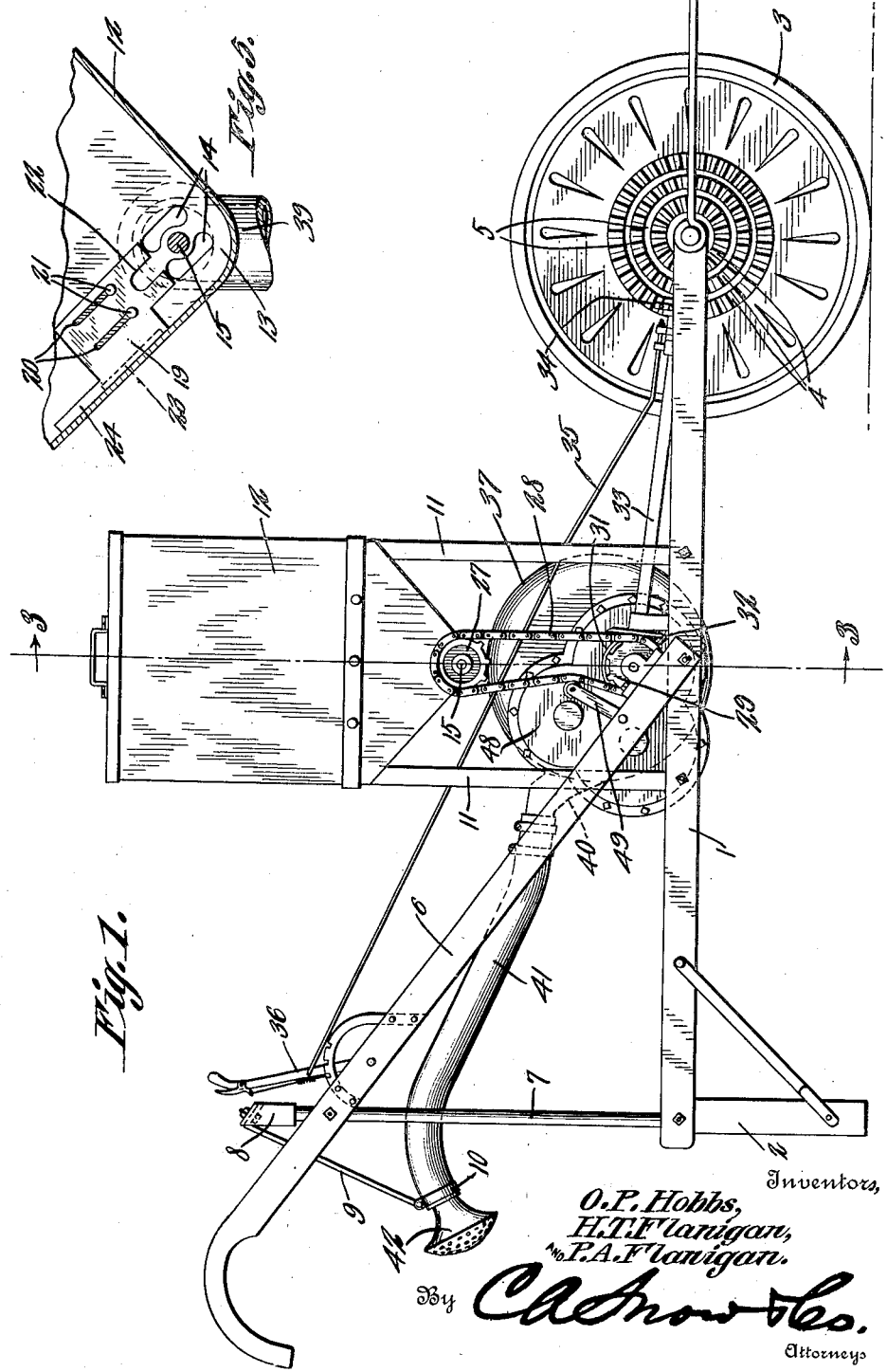

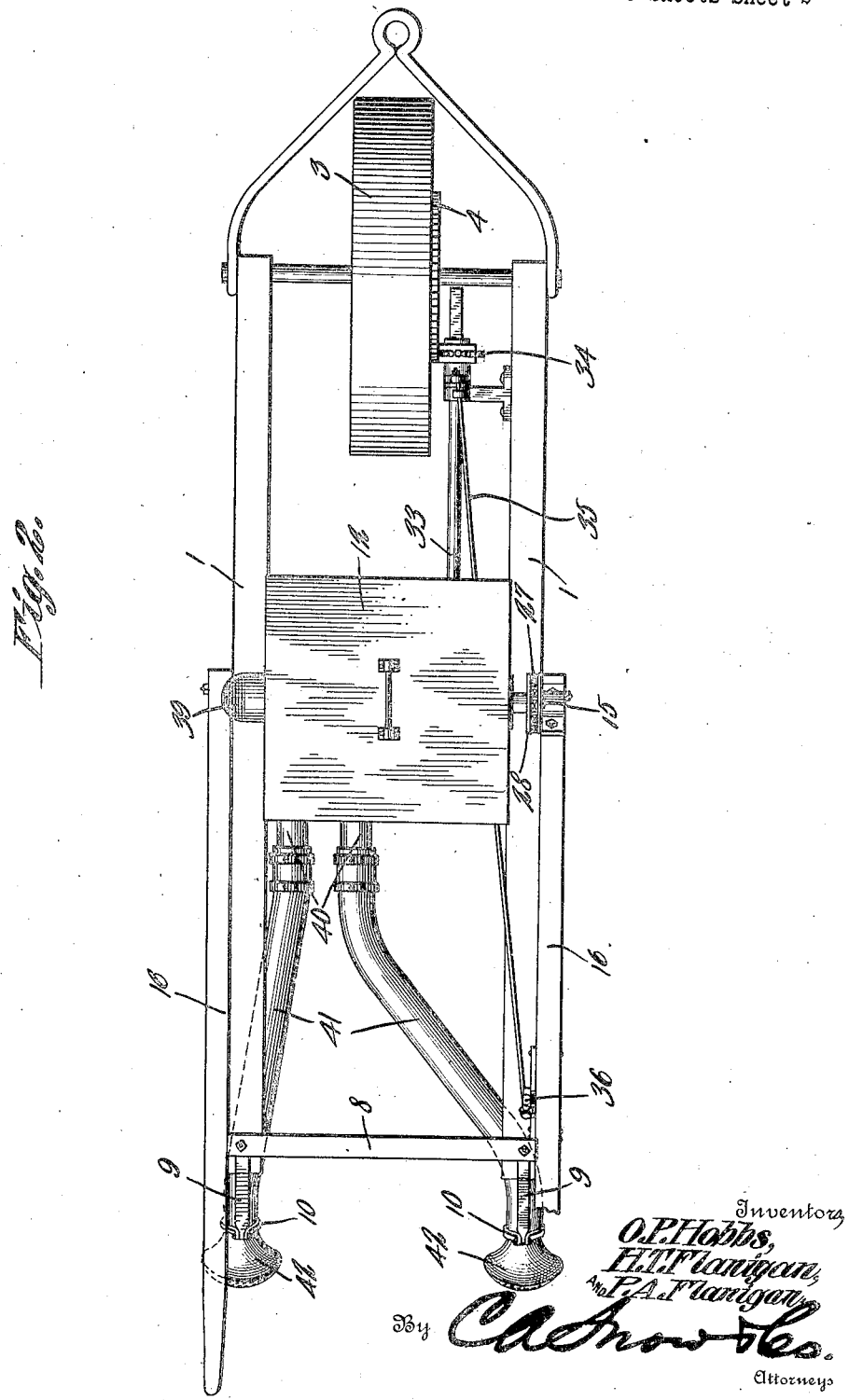

Patented Dec. 11, 1923.

1,476,889

UNITED STATES PATENT OFFICE.

ORACE PHILIP HOBBS, OF ROYSTON, AND PINKNEY A. FLANIGAN AND HIRAM T. FLANIGAN, OF WINDER, GEORGIA.

COTTON DUSTER.

Application filed December 26, 1922. Serial No. 608,977.

*To all whom it may concern:*

Be it known that we, ORACE PHILIP HOBBS, PINKNEY A. FLANIGAN, and HIRAM T. FLANIGAN, citizens of the United States, residing, respectively, at Royston, Winder, and Winder, in the counties of Franklin and Barrow and State of Georgia, have invented a new and useful Cotton Duster, of which the following is a specification.

This invention relates to a machine for applying poisonous powder to vegetation, such as cotton plants, one of the objects of the invention being to provide a structure of this character in the form of an attachment for a plow or cultivator whereby, during the cultivation of the rows of plants the powder can be applied thereto for the purpose of destroying boll weevils and other insects destructive of plant life.

A further object is to provide a dusting apparatus which is simple and efficient, will not readily get out of order, and which can be employed for dusting two or more rows simultaneously.

Another object is to provide novel means for controlling the delivery of the powder from the apparatus, it being possible to use a comparatively small amount over an extensive area.

A still further object is to provide simple means for indicating the amount per acre delivered from the machine when the delivery means is set.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit of the invention as claimed.

In the accompanying drawings the preferred form of the invention has been shown.

In said drawings

Figure 1 is a side elevation.

Figure 2 is a plan view.

Figure 3 is a section on line 3—3, Figure 1.

Figure 4 is an enlarged section on line 4—4, Figure 3.

Figure 5 a section showing the outlet of the hopper.

Figure 6 is a section through the gear housing of the blower.

Referring to the figures by characters of reference, 1 designates the frame of the plow or cultivator provided at one end with standards 2 to which the soil engaging shovels or the like (not shown), are to be connected. A supporting wheel 3 is journaled in the front end of the frame and is provided on one side with spaced annular gears 4 separated by channels 5. Handles 6 are extended from the frame 1 and are reinforced by braces 7. These braces also support a cross strip 8 to which are connected hangers 9 having clamps 10 at their lower ends.

Detachably mounted on the sides of the frame 1 are standards 11 which support a hopper 12 the bottom of which has its walls converging to provide a transverse trough 13. One side wall of the hopper has spaced outlet openings 14 therein and a shaft 15 is journaled between these openings and also in the opposite side of the hopper. Secured to the shaft 15 so as to rotate therewith is a worm 16 extending longitudinally of the trough 13 and located on the shaft at one end of the worm and close to the openings 14 are one or more arms 17 extending radially and carrying steel brushes 18 adapted to wipe over the openings and prevent them from clogging.

Slidably mounted on that wall of the hopper containing the openings 14 is a gate 19 having longitudinal slots 20 through which extend guide studs 21. The gate is forked at 22 to straddle the shaft 15 and can be moved longitudinally so as to partly or entirely close or open the outlets 14. The gate covers a slot 23 formed in the wall of the hopper and has a wing or extension 24 whereby material can be prevented from leaking through the slot when the outlets 14 are closed. A finger 25 is extended from the gate and through slot 23 and has an index or pointer 26 at its outer end which cooperates with a series of graduations to indicate the number of pounds that will be distributed to the acre when the gate is set as indicated. By means of this arrangement the adjustment of the outlet openings can be effected minutely and the discharge of powder can be accurately controlled. Obviously when the shaft 15 is rotated the worm 16 will direct the powder in the hopper toward the openings 14 through which it will be forced in quantities dependent upon the size of the exposed portions of the openings. The brushes will prevent the openings from clogging.

Secured to one end of the shaft 15 is a sprocket 27 adapted to receive motion through a chain 28 from a sprocket 29 secured to a shaft 30. This last mentioned shaft is journaled at one side of the frame 1 and has a beveled gear 31 meshing with a beveled gear 32 secured to a shaft 33. The forward end of the shaft has a pin tooth gear 34 feathered or otherwise mounted thereon so as to rotate therewith and slide thereon. The gear is adapted to mesh with any one of the gears 4 and when moved into either of the grooves or channels 5 will remain stationary or neutral. A rod 35 is connected to the gear for the purpose of shifting it along the shaft 33 and this rod can be connected to a lever 36 mounted on one of the handles 6.

Mounted under the hopper 12 is a blower casing 37 having an inlet at the center of one side thereof as shown at 38. A flue 39 extends to this inlet from the outlet openings 14 so that material delivered from the hopper 12 will be sucked into the casing 37. Casing 37 has a tangential outlet 40 or, as shown in the drawings, two or even more of these outlets can be provided. To each outlet 40, which is in the form of a tubular extension, is connected a hose 41 having a nozzle 42 at its rear end designed to scatter powder broadcast when delivered therefrom. Each hose is engaged and supported by one of the clamps 10.

A shaft 43 is journaled in the blower casing 37 and carries a blower 44. A gear 45 is secured to one end of this shaft and motion is adapted to be transmitted thereto through a train of gears, 46, from a gear 47 on shaft 30. These gears are preferably located in a housing 48 and are adapted to run in grease. As shown in Figure 1 the chain 28 can be provided with a tightener 49. This can be of any desired construction.

It is to be understood that the mechanism for scattering powder can be made in the form of an attachment to be applied to an ordinary plow or cultivator frame. In the form shown the parts can be readily bolted or otherwise secured to the frame. As the device is drawn between rows of plants the gear 34 will be driven so as to actuate chain 28 and operate the worm 16 and brushes 18. The blower 44 will, at the same time, be driven at a high speed and suck into the housing 37 all of the powder delivered through the openings 14. This powder will then be ejected into the hose 41 and scattered through the nozzles to the adjacent plants. It has been found in practice that by using an apparatus such as described an insecticide like powdered calcium arsenate, can be dusted efficiently over two or more rows of plants. By having a shifting gear 34 the mechanism can be operated at a desired speed and by moving the gear out of engagement with either of the gears 4 and into one of the channels or grooves 5 the mechanism can be brought to a stop while the machine is being turned or while it is being moved to or from the place of use.

It is to be understood that, if desired, the driving mechanism can be varied. For example a friction drive could be used instead of that illustrated or chain and sprocket mechanism could be used instead of gears for shaft 33.

Importance is attached to the particular placing of the hopper which is directly over the blower. It has been found in practice that such an arrangement facilitates the free and unobstructed flow of the powder and will tend to prevent clogging.

What is claimed is:—

The combination with a supporting structure including a wheel actuated gear, of an attachment for the structure including a hopper on the structure and having a side outlet, a gate slidably mounted in the hopper for controlling the flow of material through the outlet, an index movable with the gate and outside the hopper, there being a slot in the hopper for the index, means for closing the slot, a blower casing having an inlet and an outlet, means for conducting material from the hopper outlet to the inlet of the casing, speed multiplying mechanism operated by said gear for actuating the blower in the casing, and means for forcing material through the outlet of the hopper.

In testimony that we claim the foregoing as our own, we have hereto affixed our signatures.

ORACE PHILIP HOBBS.
PINKNEY A. FLANIGAN.
HIRAM T. FLANIGAN.

Witnesses:
T. W. Burson,
Jno. S. Craft.